United States Patent
Glynn

(10) Patent No.: US 7,295,984 B2
(45) Date of Patent: Nov. 13, 2007

(54) SYSTEMS AND METHODS FOR PROVIDING VOICE AND DATA INTERFACES TO WEB SERVICES-BASED APPLICATIONS

(75) Inventor: F. Joseph Glynn, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 879 days.

(21) Appl. No.: 10/435,368

(22) Filed: May 9, 2003

(65) Prior Publication Data

US 2004/0019476 A1    Jan. 29, 2004

Related U.S. Application Data

(60) Provisional application No. 60/379,597, filed on May 9, 2002.

(51) Int. Cl.
*G10L 21/06* (2006.01)
(52) U.S. Cl. .................................. 704/270.1
(58) Field of Classification Search .............. 704/270.1
See application file for complete search history.

(56) References Cited

U.S. PATENT DOCUMENTS 6,519,571 B1 * 2/2003 Guheen et al. ............... 705/14
6,594,692 B1 * 7/2003 Reisman ...................... 709/219
6,832,240 B1 * 12/2004 Dutta .......................... 709/203
6,999,930 B1 * 2/2006 Roberts et al. ........... 704/270.1
7,016,845 B2 * 3/2006 Vora et al. ............... 704/270.1
7,174,297 B2 * 2/2007 Guerra et al. ............ 704/270.1

* cited by examiner

Primary Examiner—Susan McFadden
(74) Attorney, Agent, or Firm—Townsned and Townsend and Crew LLP

(57) ABSTRACT

A system and method for facilitating voice communications between an end user and a third party Internet web application. In accordance with one embodiment of the invention, the communication interface unit is operated by an entity separate from the entity operating the third party Internet web application. The communication interface unit receives a voice communication from the end user device and converts the voice communication into a data communication capable of being received and processed by the third party Internet web application. The communication interface unit then transmits the data communication to the third party Internet web application for processing. After the third party Internet web application has processed at least a portion of the data communication, the communication interface unit receives a data communication back from the third party Internet web application. The communication interface unit then converts the data communication into a voice communication and transmits the voice communication to the end user device.

23 Claims, 2 Drawing Sheets

SYSTEMS AND METHODS FOR PROVIDING VOICE AND DATA INTERFACES TO WEB SERVICES-BASED APPLICATIONS

CROSS-REFERENCES TO RELATED APPLICATIONS

This patent application claims the benefit of U.S. Provisional Patent Application Ser. No. 60/379,597 filed on May 9, 2002 and entitled "Systems and Methods for Implementing Network-Based Voice Services," the entirety of which is incorporated by reference herein for all purposes.

BACKGROUND OF THE INVENTION

The present invention relates generally to systems and methods for providing voice and data service interfaces to web services-based applications, and more specifically to systems and methods for providing voice service application interfaces to web services.

For years now, the Internet and the World Wide Web (the "Web") have been used to obtain and share information with people (via browsers) on any number of topics. Now, however, with the advent of the eXtensible markup language (XML) and other dynamic Web protocols and applications, such as Java, it is now possible to share and provide applications and services on the Web. Such services are now being referred to as "web services."

The web services movement is taking off because of the ease that applications can exchange data with XML. From a service provider's (e.g. an e-shop) point of view, if they can set-up a web site they can join the global community.

In the context of web services, the term "services" does not mean monolithic coarse-grained services like Amazon.com™, but, rather, component services that others might use to build bigger services. Microsoft's™ Passport™, for instance, offers an authentication function exported on the Web. So hypothetically, an electronic newspaper like the New York Times™ can avoid creating its own user authentication service, delegating it to Passport™.

A more formal definition of a web service may be borrowed from IBM's™ tutorial on the topic:

"Web services are a new breed of Web application. They are self-contained, self-describing, modular applications that can be published, located, and invoked across the Web. Web services perform functions, which can be anything from simple requests to complicated business processes . . . Once a Web service is deployed, other applications (and other Web services) can discover and invoke the deployed service."

There are a number of companies and organizations active in developing web services applications. Examples of component services that are reusable building blocks include currency conversion, language translation, shipping, and claims processing, to name but a few.

With the increase in use of cellular phones and mobile computing devices, one area in which web services can be utilized is to provide a voice interface to the Internet. Because of the small nature of these mobile communications and computing devices, it many times would be easier to communicate with internet web pages using voice commands rather than using "point-and-click" actions or typing key strokes. Similarly, it would be easier to listen to commands and information from web sites, rather than trying to read truncated web pages on small mobile device screens.

Thus, what is needed is a system and method for facilitating voice communications with web site servers and pages, using for example, SALT or other web-based communications and protocols.

BRIEF SUMMARY OF THE INVENTION

A system and method for facilitating voice communications between an end user and a third party Internet web application. In accordance with one embodiment of the invention, the communication interface unit is operated by an entity separate from the entity operating the third party Internet web application. The communication interface unit receives a voice communication from the end user device and converts the voice communication into a data communication capable of being received and processed by the third party Internet web application. The communication interface unit then transmits the data communication to the third party Internet web application for processing.

After the third party Internet web application has processed at least a portion of the data communication, the communication interface unit receives a data communication back from the third party Internet web application. The communication interface unit then converts the data communication into a voice communication and transmits the voice communication to the end user device.

In accordance with one embodiment of the present invention, the communication interface unit converts the voice communication into hypertext markup language (HTML) commands. In accordance with another embodiment of the invention, the communication interface unit converts the voice communication into extensible markup language (XML) elements, which, for example, may comprise speech application language tags (SALT).

In accordance with one embodiment of the invention, the end user device may comprises any number of different types of computing and communication devices, such as, a cellular telephones, a wire-line telephone, a personal digital assistant (PDA), a tablet PC, a notebook PC, a desktop PC, a tower PC, an intelligent workstation, or the like.

In accordance with yet another embodiment of the present invention, the voice communication from the end user device originates through a plain old telephone system (POTS) network, for example via local telephone number, pay telephone number, or a toll free number, such as a "1-8XX" number. The POTS voice communication then may be converted into a voice over IP (VoIP) communication stream and transmitted to the communication interface unit over a VoIP network. In accordance with an alternative embodiment of the present invention, the voice communication from the end user device originates on and is communicated through a VoIP network.

In accordance with yet another embodiment of the present invention, the communication interface unit comprises an interactive voice response unit configured to prompt the end user to enter selections from a menu and convert the selections into the data communication. In yet another embodiment, the communication interface unit comprises a voice recognition system configured to convert the voice communication into the data communication.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates generally to systems and methods for providing voice and data service interfaces to web services-based applications, and more specifically to systems and methods for providing voice service application interfaces to web services.

Recently, a group of developers created a specification outlining a standard set of XML tags for speech applications (Speech Application Language Tags (SALT)). SALT is a speech interface markup language, which consists of a small set of XML elements, with associated attributes and DOM object properties, events and methods, which create a speech interface to web applications. SALT can be used with HTML, XHTML and other standards to write speech interfaces for both voice-only (e.g., telephony) and multimodal applications. A copy of the SALT 1.0 Specification can be found at <www.saltforum.org>, a copy of which is incorporated herein by reference for all purposes.

While the SALT specification is a good first step toward enabling voice or speech access to web applications, much more is needed. One problem is that traditional voice devices, such as telephones, cellular phones, and the like do not have the capability to communicate voice and/or audio communications to Internet web applications or web site servers. For example, a person cannot access a web page or application using voice commands communicated from a traditional telephone or a cellular telephone because the phones cannot create the necessary data access commands and protocols (e.g. SALT, SOAP, WSDL, HTML, etc.) to access the page/application. Similarly, the phones cannot interpret SALT commands that may be received from the web pages.

In addition, it is advantageous for web sites and applications to provide voice interfaces, so that mobile telecommunications devices, and even land-line telephones can access the web pages/applications without traditional web page browsers. The problem is that it is difficult and expensive for each web-based application provider to develop the necessary voice-to-web interfaces. Thus, the systems and methods of the present invention remedy these problems by providing the interface between the end users using voice or audio communication devices, and the web applications, typically communicating using Internet protocols, such as HTML, XML, Java, and the like.

The description herein readily uses the terms web site, web site server, web application, etc. With regard to the present invention described herein, these terms may be used interchangeable and refer to any web site, web page, web application, web services-based application, or any other suitable communication with an Internet web presence.

Figure 1:
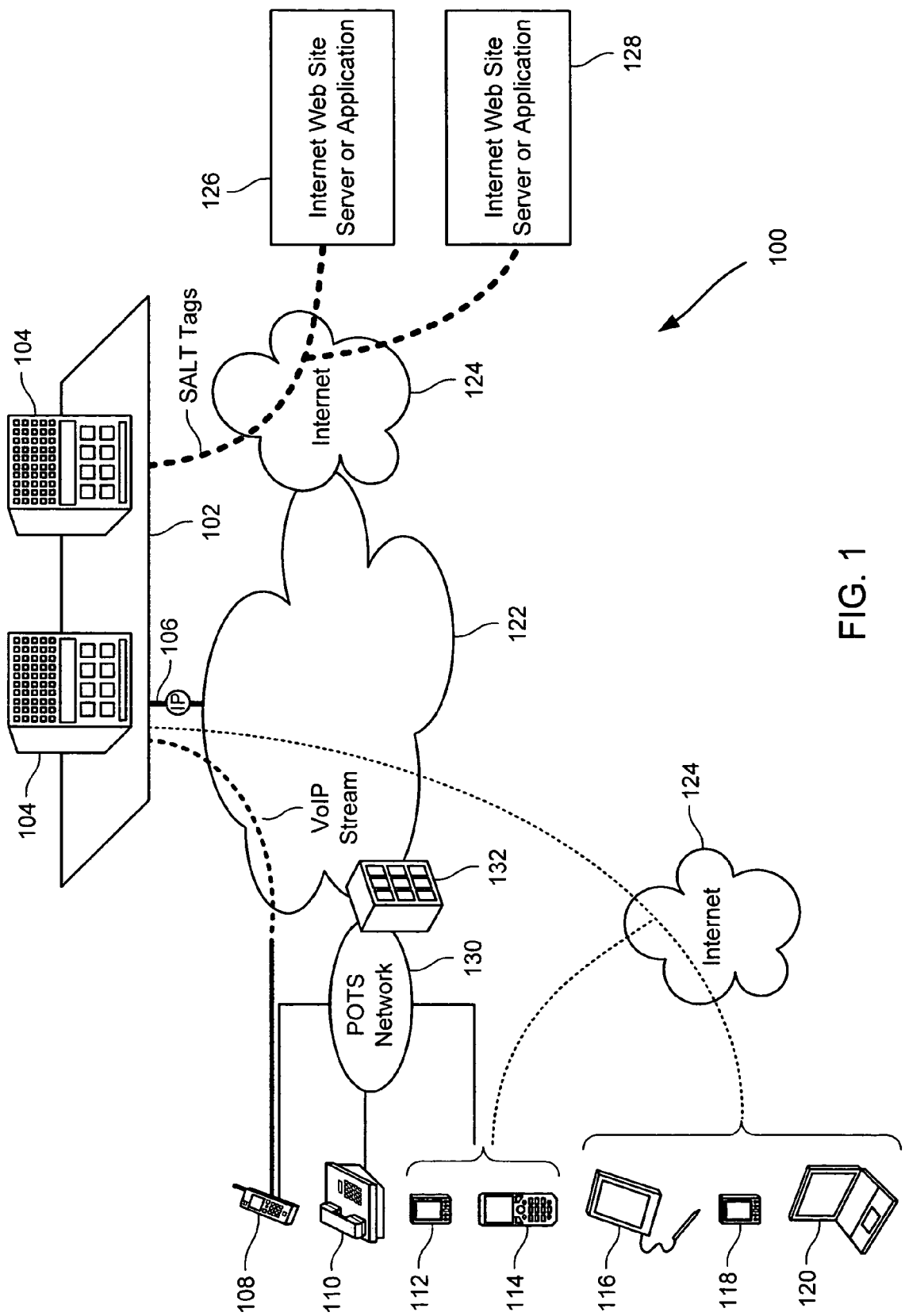
FIG. 1 is a schematic drawing showing a network configuration in which the present invention may be implemented.

Referring now to FIG. 1, a schematic diagram illustrating a network system 100, which incorporates a voice-to-web page interface system of the present invention is shown. As illustrated in FIG. 1, network system 100 comprises a web services provider site 102 configured to provide web services and applications to end users (shown as devices 108-120) and third party web site servers and applications (shown as sites 126 and 128).

In accordance with the present invention, web services provider site 102 is configured to provide the communication interface between the end users (108-120) and the third party web sites and applications (126, 128). Thus, web services provider site 102 comprises one or more communication interface units 104 configured to receive voice communications from end users (108-120) and convert the voice communications into data communications capable of being processed by the third party web applications (126, 128).

Communication interface units 104 may comprise any suitable computing devices, such as personal computers, computer servers, intelligent workstations, or the like. In one embodiment of the present invention communication interface units 104 comprise interactive voice response (IVR) units capable of prompting end users to enter information requested by or required by the third party Internet web applications 126, 128. In accordance with another embodiment of the present invention, communication interface units 104 include voice recognition functionality configured to convert at least some of the voice communication information into data commands. An example of how such functionality may be implemented is set forth below.

In accordance with one embodiment of the present invention, end users can communicate with the third party Internet web site servers and applications 126, 128, for example via communication interface units 104, using any number of different communication and/or computing devices. For instance, end users can use cellular telephones 108, traditional wire line telephones 110, personal digital assistants (PDAs) with cellular phone capabilities 112, 114, computing devices, such as tablet PCs 116, PDAs 118, and notebook computers 120, and any other communication devices.

As one skilled in the art will appreciate, cellular telephones 108 and traditional wire line telephones 110 can communicate with communication interface units 104 through traditional plain old telephone service (POTS) networks 130, which can include cellular telephone networks. For example, cellular telephones 108 and traditional wire line telephones 110 can access communication interface unit 104 by dialing a local phone number, a pay phone number, or a toll-free number, such as a "1-8XX" number. In accordance with one embodiment of the invention, communication to a voice over internet protocol (VoIP) communication, and transferred through a VoIP network 122 communication interface units 104. In accordance with this aspect of the invention, the POTS communication is converted to a VoIP communication using a conversion device 132 that converts the traditional phone communication into IP packets. As one skilled in the art will appreciate, the traditional phone communication may be in analog or digital form, and the conversion device may be located at a telecommunication service provider location, such as a phone company central office, or the like.

After the voice communication from the end user device is converted into VoIP format, it is transferred to communication interface units 104 through VoIP network 122. VoIP network 122 can be the Internet or a VoIP network developed and maintained by phone companies like Qwest Communications International Inc. located in Denver, Colo. As illustrated in FIG. 1, communication interface units 104 can communicate with the VoIP networks using high bandwidth connections 106, such as fiber optic connections or the like.

In accordance with another embodiment of the present invention, instead of cellular phones 108 and traditional wire line phones 110 communicating with communication interface units 104 via a POTS network, cellular phones 108 and wire line phones 110 may be VoIP compatible. Thus, in accordance with this aspect of the invention, cellular phones 108 and wire line phones 110 can communicate with communication interface units 104 through VoIP network 122 without having to pass through a POTS network.

In accordance with yet another embodiment of the present invention, hybrid cellular phone/PDA devices 112, 114 also can be used to communicate with web sites 126, 128 via communication interface units 104. As illustrated in FIG. 1, hybrid devices 112, 114 can communicate with interface units 104 through POTS network 130 and VoIP network 122, or devices 112, 114 can communicate with interface units 104 through the Internet 124 and/or directly through VoIP network 122. In addition, computing devices, such as tablet PCs 116, PDAs 118 and notebook computers 120, also can communicate with interface units 104, for example, through the Internet 124 and/or directly through VoIP network 122.

Upon receiving the voice communication from the end user device (108-120), communication interface unit 104 converts the voice communications into data communications capable of being processed by third party Internet web sites 126, 128. In accordance with one embodiment of the invention, communication interface unit 104 takes the voice communications and converts them into HTML or XML documents using Speech Application Language Tags (SALT). Because communication interface unit 104 essentially is providing a web service utilizing SALT and XML, interface unit 104 also may use the Simple Object Access Protocol (SOAP) to carry the communication, and Web Service Definition Language (WSDL) to define the service so other applications can use it. One skilled in the art will understand how SOAP and WSDL are utilized in web services and XML communications.

After converting the voice communications into data communications, communication interface units 104 transmit the data communications (e.g., HTML, xHTML, XML, or Java documents using SALT) to web site servers 126, 128, for example, via the Internet 124. Upon receiving the data communications, web site servers 126, 128 (e.g., running one or more applications on the server), process the communications and, in some instances, respond by sending data communications (e.g., SALT commands) back to communication interface unit 104. Communication interface unit 104 then converts or translates the SALT commands into voice communications.

In accordance with this aspect of the invention, communication interface unit 104 may comprise voice generation functionality for creating voice responses from data elements. Alternatively, the SALT commands may include embedded voice or audio files in them. If that is the case, communication interface unit 104 will play the voice or audio file to the end user. The end user then can respond by entering data or speaking data back to communication interface unit 104. In this manner, communication interface unit 104 can facilitate interactive communications between end users and web site servers 126, 128 (and applications running on the servers).

As mentioned above, communication interface unit 104 may further comprise IVR capabilities or voice recognition capabilities. With regard to the IVR capabilities, communication interface unit 104 may be configured to prompt the end user to enter DTMF data or a voice response based an initial menu located on communication interface unit 104. For example, an end user may dial a number to access communication interface unit 104, and device 104 may provide the end user with a menu of choices the end user may select (e.g., press or say "book" to access books at Amazon.com, press or say "bid status" to check a bid at ebay.com, etc.). Upon selecting one of the options, communication interface unit 104 then may facilitate further interaction between the end user and the web site. For example, the web site may communicate SALT documents back to communication interface unit 104, which instruct device 104 how to respond to the end user. In continuing with this example, assume the end user selected Amazon.com, upon receiving a data communication from Amazon.com instructing communication interface unit 104 on how to respond to the end user, communication interface unit 104 may present another menu to the end user (e.g., press or say 1 to shop for books, press or say 2 to shop for software, press or say 3 to shop for consumer electronics, etc.) As one skilled in the art will appreciate, this interactive communication can continue until the end user has processed an order or obtained the information he/she wanted.

In addition, instead of using menu functions, communication interface unit 104 may further include voice recognition and generation functionality, which can be used to obtain information from and communicate information to the end user. In accordance with this embodiment of the invention, the end user, for example, may speak the command he/she wishes to invoke, and communication interface unit 104 will convert the speech to data and access the site. Similarly, communication interface unit 104 then can receive data commands or communications from the web site, convert them to speech, and transmit the speech to the end user. In this manner, communication interface unit 104 facilitates a virtual conversation between the end user and the web site.

Figure 2:
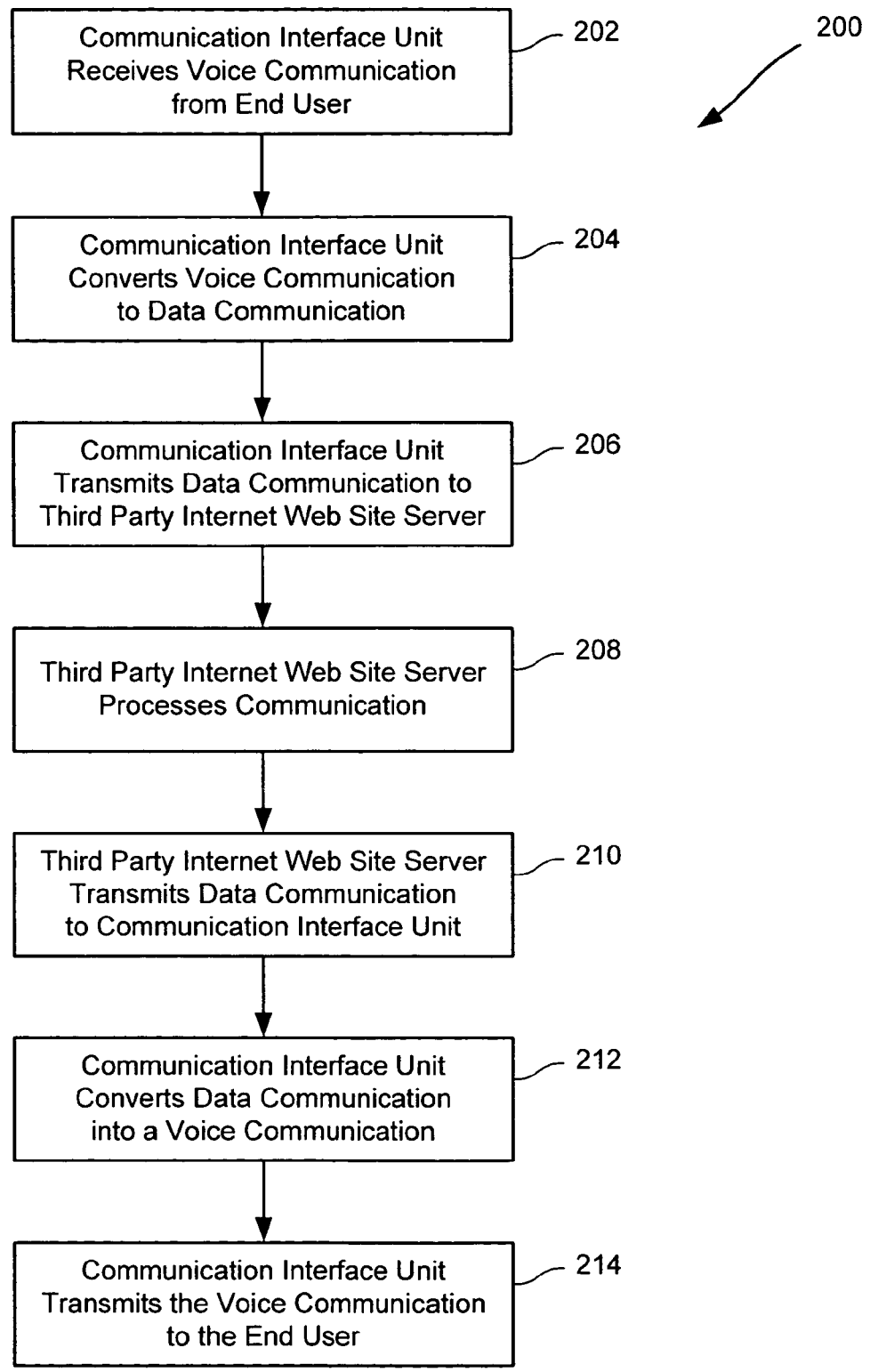
FIG. 2 is a flow chart showing steps of one embodiment of the method of the present invention.

Referring now to FIG. 2, a method for providing voice-to-data web services in accordance with the present invention will be described with reference to flow chart 200. First, communication interface unit 104 receives one or more voice communications from end user devices 108-120 (block 202). Upon receiving the voice communication, communication interface unit 104 converts the voice communication into a data communication (e.g., a SALT-based communication) (block 204) and transmits the data communication to a third party Internet web site server (block 206).

At the web site server 126, 128 the data communication is processed (block 208), and in many instances a data response is generated and transmitted back to communication interface unit 104 (block 210). Communication interface unit 104 then converts the data communication into a voice communication (block 212) and transmits the voice communication to the end user (block 214). In this manner, communication interface unit 104 provides web services and applications that facilitate the interactive communication between voice- or audio-based devices and web sites.

In conclusion, the present invention provides novel systems and methods for providing voice-to-web application server interface applications and web services between end users and web sites. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for facilitating voice communications between an end user and a third party Internet web application accessible via a web browser, the method comprising:
   providing a communication interface unit being operated by an entity separate from an entity operating the third party Internet web applications;
   the communication interface unit receiving a voice communication from an audio end user device without a web browser;
   the communication interface unit converting the voice communication into a data communication capable of being received and processed by the third party Internet web application;
   the communication interface unit transmitting the data communication to the third party Internet web application;
   after at least some data processing at the third party Internet web application, receiving at the communication interface unit a data communication from the third party Internet web application;
   the communication interface unit converting the data communication into a voice communication; and
   transmitting the voice communication to the end user device.

2. The method as recited in claim 1, wherein the step of converting the voice communication into a data communication comprises converting the voice communication into speech application language tag (SALT) commands.

3. The method as recited in claim 1, wherein the step of converting the voice communication into a data communication comprises converting the voice communication into extensible markup language (XML) elements.

4. The method as recited in claim 3, wherein the XML elements comprise speech application language tag (SALT) commands.

5. The method as recited in claim 1, wherein the end user device comprises a device selected from the group consisting of a cellular telephone, a wire-line telephone, a personal digital assistant (PDA), a tablet PC, a notebook PC, a desktop PC, a tower PC, and an intelligent workstation.

6. The method as recited in claim 1, wherein the step of receiving a voice communication from an end user device comprises receiving a voice communication, which originates through a plain old telephone system (POTS) network.

7. The method as recited in claim 6, wherein the voice communication that originates through a POTS network comprises a toll-free telephone call.

8. The method as recited in claim 6, further comprising:
   converting the POTS voice communication into a voice over IP (VoIP) communication stream; and
   transmitting the VoIP communication stream to the communication interface unit over a VoIP network.

9. The method as recited in claim 1, wherein the step of receiving a voice communication from an end user device comprises receiving a voice communication over a voice over IP (VoIP) network.

10. The method as recited in claim 1, wherein the step of the communication interface unit transmitting the data communication to the third party Internet web application comprises transmitting the data communication over the Internet.

11. The method as recited in claim 1, wherein the communication interface unit comprises an interactive voice response unit configured to prompt the end user to enter selections from a menu and convert the selections into the data communication.

12. The method as recited in claim 1, wherein the communication interface unit comprises a voice recognition system configured to convert the voice communication into the data communication.

13. A system for facilitating voice communications between an end user and a third party Internet web application accessible via a web browser, the system comprising:
   a communication interface unit being operated by an entity different from an entity operating a third party Internet web application, said communication interface unit configured to:
   receive a first voice communication from an audio end user device without a web browser;
   convert the voice communication into a first data communication capable of being received and processed by the third party Internet web application;
   transmit the first data communication to the third party Internet web application;
   receive a second data communication from the third party Internet web application;
   convert the second data communication into a second voice communication; and
   transmit the second voice communication to the end user device.

14. The system as recited in claim 13, wherein the communication interface unit is configured to convert the first voice communication into speech application language tag (SALT) commands.

15. The system as recited in claim 13, wherein the communication interface unit in configured to convert the first voice communication into extensible markup language (XML) elements.

16. The system as recited in claim 15, wherein the XML elements comprise speech application language tags (SALT).

17. The system as recited in claim 13, wherein the end user device comprises a device selected from the group consisting of a cellular telephone, a wire-line telephone, a personal digital assistant (PDA), a tablet PC, a notebook PC, a desktop PC, a tower PC, and an intelligent workstation.

18. The system as recited in claim 13, wherein the first voice communication from the end user device originates through a plain old telephone system (POTS) network.

19. The system as recited in claim 18, wherein the first voice communication that originates through a POTS network comprises a toll-free telephone call.

20. The system as recited in claim 18, further comprising a POTS-to-VoIP conversion device configured to convert the POTS voice communication into a voice over IP (VoIP) communication stream and transmit the VoIP communication stream to the communication interface unit over a VoIP network.

21. The system as recited in claim 13, wherein the communication interface unit transmits the first data communication to the third party Internet web application over the Internet.

22. The system as recited in claim 13, wherein the communication interface unit comprises an interactive voice response unit configured to prompt the end user to enter selections from a menu and convert the selections into the first data communication.

23. The system as recited in claim 13, wherein the communication interface unit comprises a voice recognition system configured to convert the voice communication into the data communication.

* * * * *